United States Patent
Pointer et al.

(10) Patent No.: US 8,650,071 B2
(45) Date of Patent: Feb. 11, 2014

(54) MOBILE COUPON ANALYSIS SYSTEMS AND METHODS

(75) Inventors: Barry F. Pointer, Lithonia, GA (US); Dominic Morea, Marietta, GA (US); Bengt Horsma, Alpharetta, GA (US); Christopher Wuhrer, Marietta, GA (US); Jerome Myers, Villa Rica, GA (US); Michelangelo R. Ho, Atlanta, GA (US); Sarah Owen, Atlanta, GA (US)

(73) Assignee: First Data Corporation, Greenwood Village, CO (US)

( * ) Notice: Subject to any disclaimer, the term of this patent is extended or adjusted under 35 U.S.C. 154(b) by 432 days.

(21) Appl. No.: 12/776,931

(22) Filed: May 10, 2010

(65) Prior Publication Data
US 2011/0276378 A1    Nov. 10, 2011

(51) Int. Cl.
*G06Q 30/00*    (2012.01)

(52) U.S. Cl.
USPC ........................................................ 705/14.1

(58) Field of Classification Search
USPC ............................................................ 705/14
See application file for complete search history.

(56) References Cited

U.S. PATENT DOCUMENTS

| | | | |
|---|---|---|---|
| 4,554,446 A | 11/1985 | Murphy et al. | |
| 5,200,889 A | 4/1993 | Mori | |
| 5,220,501 A | 6/1993 | Lawlor et al. | |
| 5,256,863 A | 10/1993 | Ferguson et al. | |
| 5,471,669 A * | 11/1995 | Lidman | 235/383 |
| 5,555,496 A | 9/1996 | Tackbary et al. | |
| 5,696,908 A | 12/1997 | Muehlberger et al. | |
| 5,699,528 A | 12/1997 | Hogan | |
| 5,757,917 A | 5/1998 | Rose et al. | |
| 5,774,879 A | 6/1998 | Custy et al. | |
| 5,777,305 A | 7/1998 | Smith et al. | |
| 5,826,241 A | 10/1998 | Stein et al. | |
| 5,832,458 A | 11/1998 | Jones | |
| 5,899,980 A | 5/1999 | Wilf et al. | |
| 5,905,246 A | 5/1999 | Fajkowski | |
| 5,923,016 A | 7/1999 | Fredregill et al. | |

(Continued)

FOREIGN PATENT DOCUMENTS

| | | | |
|---|---|---|---|
| EP | 0911772 A2 | 4/1999 | |
| EP | 0949596 A2 | 10/1999 | |

(Continued)

OTHER PUBLICATIONS

International Search Report and Written Opinion of PCT/US2011/035756 mailed on Oct. 31, 2011, 11 pages.

(Continued)

*Primary Examiner* — Matthew L Hamilton
(74) *Attorney, Agent, or Firm* — Kilpatrick Townsend & Stockton LLP

(57) ABSTRACT

Methods and systems are described for issuing and settling electronic coupons. A financial service host may receive authorization and settlement information, wherein the authorization and settlement information comprises an account number of the consumer. The account number may be linked to an account of the consumer enrolled in an electronic coupon program. The methods and system may also include transmitting a notification to the consumer that indicates the electronic coupon has been redeemed. A monetary value associated with the electronic coupon may be debited from an account linked to the merchant, and the account of the consumer may be credited with the monetary value associated with the electronic coupon.

11 Claims, 6 Drawing Sheets

(56) References Cited

U.S. PATENT DOCUMENTS

| | | | |
|---|---|---|---|
| 5,960,412 | A | 9/1999 | Tackbary et al. |
| 5,987,140 | A | 11/1999 | Rowney et al. |
| 5,987,429 | A | 11/1999 | Maritzen et al. |
| 5,991,750 | A | 11/1999 | Watson |
| 5,999,625 | A | 12/1999 | Bellare et al. |
| 6,000,608 | A | 12/1999 | Dorf |
| 6,012,045 | A | 1/2000 | Barzilai et al. |
| 6,012,048 | A | 1/2000 | Gustin et al. |
| 6,032,133 | A | 2/2000 | Hilt et al. |
| 6,044,363 | A | 3/2000 | Mori et al. |
| 6,058,379 | A | 5/2000 | Odom et al. |
| 6,058,417 | A | 5/2000 | Hess et al. |
| 6,070,798 | A | 6/2000 | Nethery |
| 6,073,117 | A | 6/2000 | Oyanagi et al. |
| 6,088,684 | A | 7/2000 | Custy et al. |
| 6,098,053 | A | 8/2000 | Slater |
| 6,119,106 | A | 9/2000 | Mersky et al. |
| 6,122,625 | A | 9/2000 | Rosen |
| 6,167,386 | A | 12/2000 | Brown |
| 6,175,823 | B1 | 1/2001 | Van Dusen |
| 6,226,623 | B1 | 5/2001 | Schein et al. |
| 6,246,996 | B1 | 6/2001 | Stein et al. |
| 6,308,887 | B1 | 10/2001 | Korman et al. |
| 6,336,099 | B1 | 1/2002 | Barnett et al. |
| 6,473,500 | B1 | 10/2002 | Risafi et al. |
| 6,847,935 | B1 | 1/2005 | Solomon et al. |
| 7,006,983 | B1 | 2/2006 | Packes et al. |
| 7,028,896 | B2 | 4/2006 | Goldstein et al. |
| 2001/0047342 | A1 | 11/2001 | Cuervo |
| 2002/0049669 | A1 | 4/2002 | Bleser et al. |
| 2002/0062253 | A1* | 5/2002 | Dosh et al. ............... 705/14 |
| 2002/0107738 | A1* | 8/2002 | Beach et al. .............. 705/14 |
| 2002/0152116 | A1 | 10/2002 | Yan et al. |
| 2002/0161641 | A1 | 10/2002 | Quinlan et al. |
| 2002/0165795 | A1 | 11/2002 | Holley et al. |
| 2003/0001005 | A1 | 1/2003 | Risafi et al. |
| 2003/0024981 | A1 | 2/2003 | Narasimhan |
| 2003/0053609 | A1 | 3/2003 | Risafi et al. |
| 2003/0097331 | A1 | 5/2003 | Cohen |
| 2003/0115126 | A1 | 6/2003 | Pitroda |
| 2003/0150142 | A1 | 8/2003 | Street |
| 2003/0154163 | A1 | 8/2003 | Phillips et al. |
| 2003/0212595 | A1* | 11/2003 | Antonucci ................. 705/14 |
| 2003/0229541 | A1 | 12/2003 | Randall et al. |
| 2004/0083170 | A1* | 4/2004 | Bam et al. ................. 705/40 |
| 2005/0033639 | A1 | 2/2005 | Myers |
| 2005/0091115 | A1 | 4/2005 | Arthur |
| 2006/0053056 | A1* | 3/2006 | Alspach-Goss et al. ........ 705/14 |
| 2006/0122921 | A1* | 6/2006 | Comerford et al. ............ 705/35 |
| 2006/0261154 | A1 | 11/2006 | Arthur et al. |
| 2007/0022048 | A1* | 1/2007 | Kingsborough et al. ........ 705/39 |
| 2007/0156517 | A1* | 7/2007 | Kaplan et al. ................ 705/14 |
| 2007/0250380 | A1* | 10/2007 | Mankoff ..................... 705/14 |
| 2008/0059306 | A1* | 3/2008 | Fordyce et al. .............. 705/14 |
| 2008/0116260 | A1* | 5/2008 | Shafer et al. ................. 235/380 |
| 2008/0255940 | A1* | 10/2008 | Perreault et al. .............. 705/14 |
| 2009/0006212 | A1* | 1/2009 | Krajicek et al. .............. 705/14 |
| 2009/0036103 | A1 | 2/2009 | Byerley et al. |
| 2010/0106570 | A1* | 4/2010 | Radu et al. ................... 705/14.3 |
| 2011/0066483 | A1* | 3/2011 | Salmon et al. ............. 705/14.17 |
| 2011/0087530 | A1* | 4/2011 | Fordyce et al. ............. 705/14.17 |
| 2011/0191160 | A1* | 8/2011 | Blackhurst et al. ........ 705/14.38 |
| 2013/0159085 | A1* | 6/2013 | Mankoff et al. ........... 705/14.27 |
| 2013/0173372 | A1* | 7/2013 | Misra et al. ................ 705/14.23 |

FOREIGN PATENT DOCUMENTS

| | | |
|---|---|---|
| EP | 1077436 A2 | 2/2001 |
| KR | 10-2006-0109303 A | 10/2006 |
| KR | 10-2007-0075986 A | 7/2007 |
| WO | WO 00/22559 A1 | 4/2000 |
| WO | WO 00/34899 A1 | 6/2000 |
| WO | WO 00/54122 A2 | 9/2000 |
| WO | WO 00/67177 A2 | 11/2000 |
| WO | WO 00/79452 A2 | 12/2000 |
| WO | WO 01/04816 A1 | 1/2001 |
| WO | WO 01/41419 A1 | 6/2001 |
| WO | WO 2004/061736 A1 | 7/2004 |

OTHER PUBLICATIONS

Debit-it, Internet, httc:/lwww.debit-it.com, downloaded Feb. 7, 2000.
DotBank, Internet, httc:/lwww.dotbank.com, downloaded Feb. 7, 2000.
Intell-A-Check, Internet, httc:/lwww.icheck.com, downloaded Feb. 7, 2000.
PayMe.com, Internet, httcs:/lssl.idealab.com, downloaded Feb. 7, 2000.
PayPal.com, Internet, httc:/lwww.paypal.com, Feb. 7,2000.
TeleCheck, Making checks Our Responsibility, Internet, httc:/lwww.telecheck.com, Feb. 7, 2000.
TeleCheck, Verification Services, Internet, httc:/ltelecheck.com, downloaded Feb. 7, 2000.
The Denver Post, Apr. 1, 2002, Rebate Quests Often Result in Unhappy Returns.
TransPoint, Internet, http://www.transpoint.com, Feb. 10, 2000.
U.S. Appl. No. 10/167,720, Final Office Action dated Oct. 31, 2008, 12 pages.
U.S. Appl. No. 10/167,720, Final Office Action dated Feb. 8, 2008, 11 pages.
U.S. Appl. No. 10/167,720, Office Action dated Jun. 5, 2008, 9 pages.
U.S. Appl. No. 10/167,720, Office Action Apr. 6, 2009, 14 pages.
U.S. Appl. No. 10/167,720, Advisory Action dated Dec. 23, 2008, 2 pages.
U.S. Appl. No. 10/167,720, Advisory Action dated Apr. 16, 2008, 3 pages.
U.S. Appl. No. 10/167,720, Office Action dated Oct. 19, 2007, 8 pages.
U.S. Appl. No. 10/238,044, Advisory Action dated Oct. 20, 2008, 3 pages.
U.S. Appl. No. 10/238,044, Final Office Action dated Aug. 4, 2008, 12 pages.
U.S. Appl. No. 10/238,044, Office Action dated Jan. 16, 2009, 14 pages.
U.S. Appl. No. 10/238,044, Office Action dated Apr. 2, 2008, 8 pages.
U.S. Appl. No. 10/238,044, Final Office Action dated Jun. 2, 2009, 18 pages.
U.S. Appl. No. 10/356,368, Advisory Action dated May 21, 2008, 3 pages.
U.S. Appl. No. 10/356,368, Advisory Action dated Sep. 26, 2008, 3 pages.
U.S. Appl. No. 10/356,368, Final Office Action dated Mar. 13, 2008, 12 pages.
U.S. Appl. No. 10/356,368, Final Office Action dated Jul. 18, 2008, 16 pages.
U.S. Appl. No. 10/356,368, Office Action dated Oct. 25, 2007, 11 pages.
U.S. Appl. No. 10/696,014, Office Action dated Mar. 12, 2008, 7 pages.
U.S. Appl. No. 10/696,014, Advisory Action dated Nov. 26, 2008, 3 pages.
U.S. Appl. No. 10/696,014, Final Office Action dated Sep. 3, 2008, 8 pages.
U.S. Appl. No. 10/696,014, Office Action dated Apr. 1, 2009, 9 pages.
U.S. Appl. No. 10/696,014, Final Office Action dated Oct. 19, 2009, 8 pages.
U.S. Appl. No. 10/696,014, Advisory Action dated Apr. 13, 2010, 3 pages.
U.S. Appl. No. 10/696,014, Advisory Action dated May 12, 2010, 2 pages.
U.S. Appl. No. 11/419,413, Final Office Action dated Dec. 23, 2008, 16 pages.
U.S. Appl. No. 11/419,413, Office Action dated Jun. 11, 2008, 11 pages.

(56) References Cited

OTHER PUBLICATIONS

U.S. Appl. No. 11/419,413, Office Action dated Apr. 7, 2009, 14 pages.
U.S. Appl. No. 11/419,413, Final Office Action dated Oct. 15, 2009, 16 pages.
U.S. Appl. No. 11/419,413, Notice of Allowance dated May 5, 2010, 11 pages.
U.S. Appl. No. 11/837,252, Office Action dated Dec. 16, 2008, 20 pages.
U.S. Appl. No.11/837,252, Final Office Action dated Jun. 5, 2009, 20 pages.
U.S. Appl. No. 11/837,252, Advisory Action dated Aug. 14, 2009, 3 pages.
PCT International Search Report and Written Opinion mailed Jan. 27, 2009; Int'l. Application No. PCT/US2008/072638, 7 pages.

* cited by examiner

MOBILE COUPON ANALYSIS SYSTEMS AND METHODS

CROSS-REFERENCES TO RELATED APPLICATIONS

This application is related to and incorporates for all purposes application Ser. No. 10/356,368, entitled "Methods and Systems for Reconciliation of Discount Certificates," filed on Jan. 30, 2003.

BACKGROUND OF THE INVENTION

The present invention relates in general to the distribution and redemption of electronic coupons. In particular, the present invention relates to an electronic coupon distributed to mobile device of a consumer where the redemption value of the coupon may be applied to an account held by the consumer at a financial institution.

Currently, merchants and/or manufacturers may attempt to attract consumers by offering various discounts. Often, the discount may apply to a particular product (e.g., $2 off House Brand peas) or for an amount off a consumer's bill at a merchant, such as in the form of a fixed dollar discount (e.g., $5 off a purchase of $50 or more at BigStore) or a percentage (e.g., 15% off any purchase at BigStore).

Such discounts may appear in multiple forms. For example, a merchant may offer a consumer membership in a loyalty program. Such a program may involve a consumer maintaining a loyalty account, often with the loyalty account number stored on a key fob or transaction card containing a machine-readable storage medium, such as a barcode or magnetic stripe. Before payment, or at the same time, the consumer may be required to present this loyalty account number to the merchant in order to receive various discounts.

Alternatively, a merchant may offer a discount in the form of a printed coupon. Such printed coupons may be distributed to the public and/or a particular consumer base through numerous avenues, such as advertisements in newspapers, magazines, the Internet, direct mailings, etc. To receive the discount, at the time of purchase, a consumer may be required to present the coupon to the merchant. An agent of the merchant, such as a checkout clerk, may scan or read a code appearing on the coupon and apply the discount to the consumer's purchase.

These methods of distributing discounts to consumers may have considerable drawbacks. A loyalty program requiring a consumer to have a loyalty account number may be cumbersome. A consumer may be required to present his loyalty account number separate from her form of payment. This may result in the checkout process being slowed. It may also require a substantial investment from the merchant: the merchant may need to purchase and maintain hardware and software capable of performing tasks such as receiving account loyalty information, processing it, determining which discounts apply to each consumer, and storing consumer data.

A printed coupon-based system may also have drawbacks. The consumer may be required to obtain and carry a the printed coupon to the merchant, creating the possibility of a lost or misplaced coupon. The checkout process may be lengthened by the merchant's clerk attempting to determine whether the coupon is valid, properly record the coupon, and apply the discount to the consumer's purchase. The use of printed coupons may also require the investment of money by the merchant. For example, the merchant may need to purchase hardware and software to read machine-readable codes on the coupons, and/or record what coupons have been redeemed.

The invention addresses these and other problems.

BRIEF SUMMARY OF THE INVENTION

The invention provides various systems and methods for enrolling a consumer in an electronic coupon program and transmitting an electronic coupon to the consumer. The invention further provides various systems and methods for the customer to redeem electronic coupons by completing a purchase with a merchant.

In some embodiments, the merchant may offer a discount to consumers enrolled in an electronic coupon program. The merchant may alert an entity managing an electronic coupon program that it wishes to begin a coupon campaign. The coupon aggregator may transfer details of the coupon campaign to a financial institution. This financial institution may handle all of the merchant's electronic purchase transactions. A consumer may then receive an electronic coupon from the coupon aggregator or the financial institution on a mobile device indicating the merchant's discount offer. The consumer may then make a purchase at the merchant offering the discount. To complete the transaction, the consumer may pay for the purchase from an account enrolled in the electronic coupon program. The merchant may conduct the sale transaction as a typical transaction.

The consumer may receive the discount offered by the coupon after completing her purchase at the merchant. When settlement/authorization is requested by the merchant with the financial institution for the purchase, the transferred data may indicate that the consumer participates in an electronic coupon program and/or the financial institution may be able to determine as such based on the consumer's account number. The financial institution may then determine whether an electronic coupon is applicable to the consumer's purchase. If the consumer was issued an applicable coupon, a notification may be sent to the coupon aggregator that the consumer has properly redeemed the electronic coupon. A notification may be transmitted to the consumer, indicating that the coupon has been successfully redeemed.

The value of the coupon may be debited from an account of the merchant by the financial institution. The value of the coupon or a portion of the value of the coupon may be credited to an account of the consumer. This account may be the account enrolled in the electronic coupon program.

In some embodiments of the invention, a method for issuing and settling an electronic coupon is described. The method may include receiving electronic coupon campaign information. The method may also include receiving settlement/authorization information; this information may comprise an account number of the consumer. The account number of the consumer may be linked to an account enrolled in an electronic coupon program. The method may further include transmitting a notification that indicates the consumer has redeemed the electronic coupon. The method may also include debiting a monetary value associated with the electronic coupon from an account linked to the merchant and crediting the account of the consumer with the monetary value associated with the electronic coupon.

In some embodiments, the settlement information may comprise an identifier that identifies the consumer as participating in the electronic coupon program. An electronic coupon may be transmitted from the electronic coupon aggregator to a mobile device of the consumer, which may be a cellular phone. The cellular phone may have an attached RFID tag. The RFID tag may be integrated into the cellular phone or may be physically attached. The RFID tag may be used to wirelessly transmit payment information to the point-of-sale device of the merchant. The consumer may receive a redemption notification after the electronic coupon has been redeemed.

In some embodiments of the invention, a method of issuing and redeeming an electronic coupon is described. This method may include transmitting to a consumer the electronic coupon. The electronic coupon may be linked to a discount monetary amount. Settlement data from a merchant may be received. The settlement data may be linked to a purchase transaction that indicates that the consumer participates in an electronic coupon program. A determination may be made at the financial institution that the electronic coupon applies to the consumer's purchase transaction. The method may include transmitting to the mobile device of the consumer a notification that the electronic coupon has been successfully redeemed. Also, the discount monetary amount of the electronic coupon may be credited to an account linked to the consumer.

In some embodiments, settlement data may comprise an indicator that indicates the consumer participates in an electronic coupon program. The settlement data may reflect a monetary amount without subtraction of the discount monetary amount. An enrollment request may be received from the consumer. The enrollment request may indicate the consumer wishes to participate in the electronic coupon program and may indicate a financial account to enroll in the electronic coupon program. An electronic coupon may be linked to the merchant or a group of merchants. The financial account of the consumer is a stored value account. The stored value account (which may also be a credit account, debit account, etc.) of the consumer may be held by the financial institution.

In some embodiments, a method for redeeming an electronic coupon issued to a consumer by a financial institution at a merchant is described. The method may include enrolling the consumer in an electronic coupon program. The merchant may authorize a coupon aggregator to offer a plurality of consumers at least one electronic coupon for purchases from the merchant. The method may also include receiving an account identifier from the consumer at a point-of-sale device. The account identifier may be linked to an account of the consumer. The consumer may have previously received the electronic coupon on a cellular phone. The electronic coupon is linked to a monetary value discount. Also, the account identifier may be enrolled in the electronic coupon program of the financial institution. The method may also include transmitting, from the point-of-sale device of the merchant to the financial institution, a settlement request for the purchase. The settlement request may indicate the consumer's participation in an electronic coupon program. The coupon aggregator may be the financial institution.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
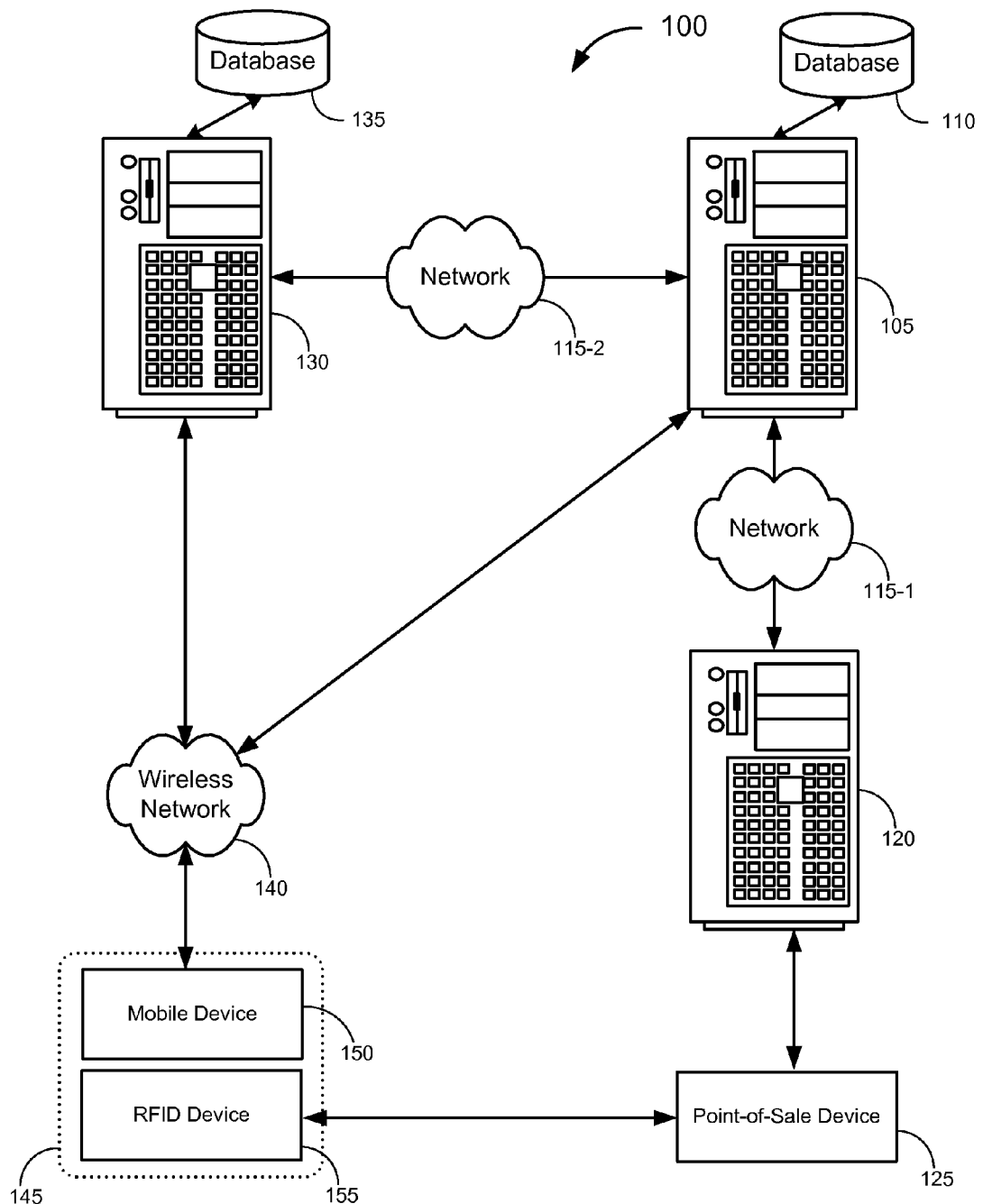
FIG. 1 illustrates a simplified embodiment of a system capable of conducting an electronic coupon program.

The invention provides various ways for coupons to be electronically distributed to consumers and redeemed by consumers. A merchant may offer a discount to consumers enrolled in an electronic coupon program by having an electronic coupon distributed. The merchant may alert an entity managing an electronic coupon program, such as a coupon aggregator, that it wishes to begin a coupon campaign. To do so, the merchant may send the coupon aggregator information about the coupons it wishes distributed. For example, the merchant may wish to offer "10% off all purchases between Nov. 27, 2009 and Dec. 24, 2009 at all BigStore locations" to some or all of the consumers enrolled in the electronic coupon program.

The coupon aggregator may transfer various specifics of the coupon campaign to a financial institution. This financial institution may handle all of the merchant's electronic purchase transactions, including credit transactions, debit transactions, and/or stored-value account transactions. A consumer may then receive an electronic coupon on a mobile device (or email, direct mailing, etc.) indicating the merchant's discount offer. For example, the consumer may receive a text message saying: "10% off all purchases made between Nov. 27, 2009, and Dec. 24, 2009, at all BigStore locations! Save Big!" After receiving the coupon, the consumer may make a purchase at the merchant offering the discount. To complete the transaction, the consumer may fund the purchase from an account, such as a stored value account, enrolled in the electronic coupon program. The merchant may conduct the sale transaction as it would conduct a sale transaction for a consumer not enrolled in an electronic coupon program. If an agent of the merchant, such as a cashier, is conducting the sale transaction, she may not be aware the consumer participates in the electronic coupon program because the transaction from her perspective is conducted identical to a typical sale transaction.

The consumer may not receive the discount offered by the electronic coupon immediately at the time of purchase from the merchant. When settlement/authorization is requested by the merchant from the financial institution for the purchase amount, the transferred settlement/authorization data may indicate that the consumer participates in an electronic coupon program. The financial institution may determine the consumer participates based on the consumer's account number. Settlement/authorization information may include all of the information necessary for the financial institution to either approve or deny a transaction, and for the financial institution to settle the transaction (e.g., debit or credit an account of the consumer, and debit or credit an account of the merchant).

Authorization/settlement information may be referred to as only settlement information for simplicity.

The financial institution may determine whether an electronic coupon is applicable to the consumer's purchase. If the consumer was issued an applicable coupon, a notification may be sent to the coupon aggregator that the consumer has properly redeemed the electronic coupon. A notification may be transmitted to the consumer, possibly by the same method the consumer was offered the coupon (e.g., SMS text message, email, etc.), indicating that the coupon has been successfully redeemed. The consumer may receive this notification in real-time or near real-time, such as within seconds or minutes of completing the purchase with the merchant.

The value of the coupon, a portion of the value of the coupon, or the value of the coupon plus a fee may be debited from an account of the merchant by the financial institution. The value of the coupon or a portion of the value of the coupon may be credited to an account of the consumer. This account may be the account enrolled in the electronic coupon program.

Such an electronic coupon system may have significant benefits. For example, a participating merchant may not need to make changes, or only minimal changes, to the equipment (e.g., point-of-sale devices, computer systems, servers, etc.) it currently uses to process electronic sale transactions. Further, because the discount is processed by the financial institution, rather than by the merchant while the consumer is waiting to complete the transaction, the amount of time to complete the purchase may not be lengthened as with other discount schemes. Also, some consumers may find it inconvenient and/or embarrassing to present coupons to a merchant at the time of sale. Such an electronic coupon system may allow the transaction to proceed without a cashier or other near-by consumers being alerted to the consumer's coupon use.

Additionally, such an arrangement may allow for a consumer to complete entire purchases, including coupon redemption, using her mobile device. For example, after the consumer receives the electronic coupon on her mobile device, she may proceed to the merchant to make a purchase. To complete the purchase, the consumer may use a payment device, such as an RFID tag, possibly affixed to or integrated with her mobile device (e.g., cellular phone) to transmit payment information to a point-of-sale device of the merchant. In this way, the consumer may have the effect of using one device to receive the electronic coupon and complete a purchase to redeem the coupon. The mobile device may then receive a confirmation indicating the coupon has been redeemed and/or that the account (possibly linked to the RFID tag) of the consumer has been credited with some or all of the value of the coupon.

A simplified embodiment of a system 100 capable of conducting such an electronic coupon program is illustrated in FIG. 1. Such a system may include a coupon aggregator computer system 130 and linked database 135, a financial institution computer system 105 and linked database 110, a merchant computer system 120, a merchant point-of-sale device 125, a network 115, a wireless network 140, a mobile device 150, and a radio frequency identification ("RFID") device 150.

A coupon aggregator computer system 130 may include any number of computers and/or servers. Such a system may be used to receive various coupon offers from merchants, product manufacturers, and/or service providers. For example, a merchant may transmit data to the coupon aggregator computer system 130 indicating that the merchant wishes to participate in an electronic coupon program and/or offer a discount to consumers or a particular group of consumers (e.g., men between the age of 27 and 35). Such information may also be entered into the coupon aggregator computer system 130 by an agent of the coupon aggregator or may be electronically transmitted to the coupon aggregator computer system 130 by a merchant, product manufacturer, or service provider. The coupon aggregator computer system 130 may receive information such as the amount and/or percent discount of the merchant's offer, the time period for the offer, what group of consumers the discount should apply to, and/or other restrictions as to the applicability of the discount.

Such information may be stored in database 135 at the coupon aggregator computer system 130. The database 135 may maintain information on which merchants, product manufacturers, and/or service providers are participating the electronic coupon program. Additionally, the database 135 may maintain information on consumers enrolled in the electronic coupon program. This may involve storing information on which merchants, product manufacturers, and/or service providers a consumer is to receive coupons from, and/or contact information for the consumer (e.g., email address, cellular phone number, address, etc).

The coupon aggregator computer system 130 may communicate with the financial institution computer system 105 through network 115-2. The network 115-2 may be the Internet, or may be some other private network (such as a private intranet) or public network. Alternatively, the coupon aggregator computer system 130 and financial institution computer system 105 may be operated by one entity serving as both the coupon aggregator and the financial institution. In such embodiments, the coupon aggregator computer system 130 and the financial institution computer system 105 may be incorporated into one computer system, connected via network 115-2, or directly connected.

The financial institution computer system 105 may be any number of computers and/or servers. A financial institution computer system 105 may communicate with one or more merchant systems to authorize and/or settle financial transactions. The financial institution computer system 105 may maintain in database 110 various account information for consumers. Such accounts may be any type of account, such as credit card accounts, debit card accounts, prepaid/stored value accounts, gift card accounts, etc. The financial institution computer system 105 may also be able to contact other financial institutions to authorize and/or settle financial transactions for accounts not held by the entity maintaining financial institution computer system 105. For example, a merchant may contract with the entity operating financial institution computer system 105 to handle all of the merchant's electronic transactions (e.g., transactions not including cash or checks). All of these transactions may be routed over a public network or a private network, possibly maintained by the same entity managing financial institution computer system 105, to the financial institution computer system 105 for either settlement/authorization, or routing to the appropriate third-party financial institution.

The merchant computer system 120 may also include any number of computers and/or servers. Such a system may receive transaction information from consumers at point-of-sale devices, such as point-of-sale device 125. Data received from point-of-sale device 125 may be processed, stored, and/or routed over network 115-1 to the financial institution computer system 105. Network 115-1 may be a private network, such as a private intranet operated by the financial institution or may be a public network, such as the Internet. Network 115-1 may be the same network as network 115-2. Alternatively, network 115-1 and network 115-2 may be different networks.

Merchant's point-of-sale device 125 may be capable of receiving transaction data from transaction cards (e.g., credit cards, debit cards, stored value cards, gift cards, etc.) stored in the form of machine-readable data. Such data may be stored in a magnetic strip, barcode, and/or any other computer-readable storage medium. The data may include information identifying an account held by the consumer. Such forms of stored data may require the transaction card to be swiped through a card reader. Such a card reader may be part of the point-of-sale device 125. The point-of-sale device 125 may also have the ability to receive data wirelessly from a consumer device, such as an RFID tag 155. RFID tag 155 may contain and transmit RFID information similar to that stored on a machine-readable transaction card, possibly including an account number of a consumer.

The RFID device 155 of the consumer may be a stand-alone device, such as a key fob, a transaction card, or in a package allowing it to be affixed to another object. For example, FIRST DATA's GO-TAGs allow for an RFID tag to be affixed to various objects. In some embodiments, a consumer may affix such an RFID device 155 to a mobile device 150, such as a cellular phone. Alternatively, an RFID device 155 may be integrated into the mobile device 150 to create a hybrid device 145. In these embodiments, the consumer may experience the effect of using the mobile device to receive an electronic coupon and complete a sale transaction to purchase items and redeem the coupon.

The mobile device 150 of the consumer may communicate with the financial institution computer system 105 and/or the coupon aggregator computer system 130 via a wireless network 140. Wireless network 140 may be operated by any wireless carrier, and may interface with another network, such as the Internet, to transfer data between the mobile device 150, the coupon aggregator computer system 130, and/or the financial institution computer system 105.

Figure 2:
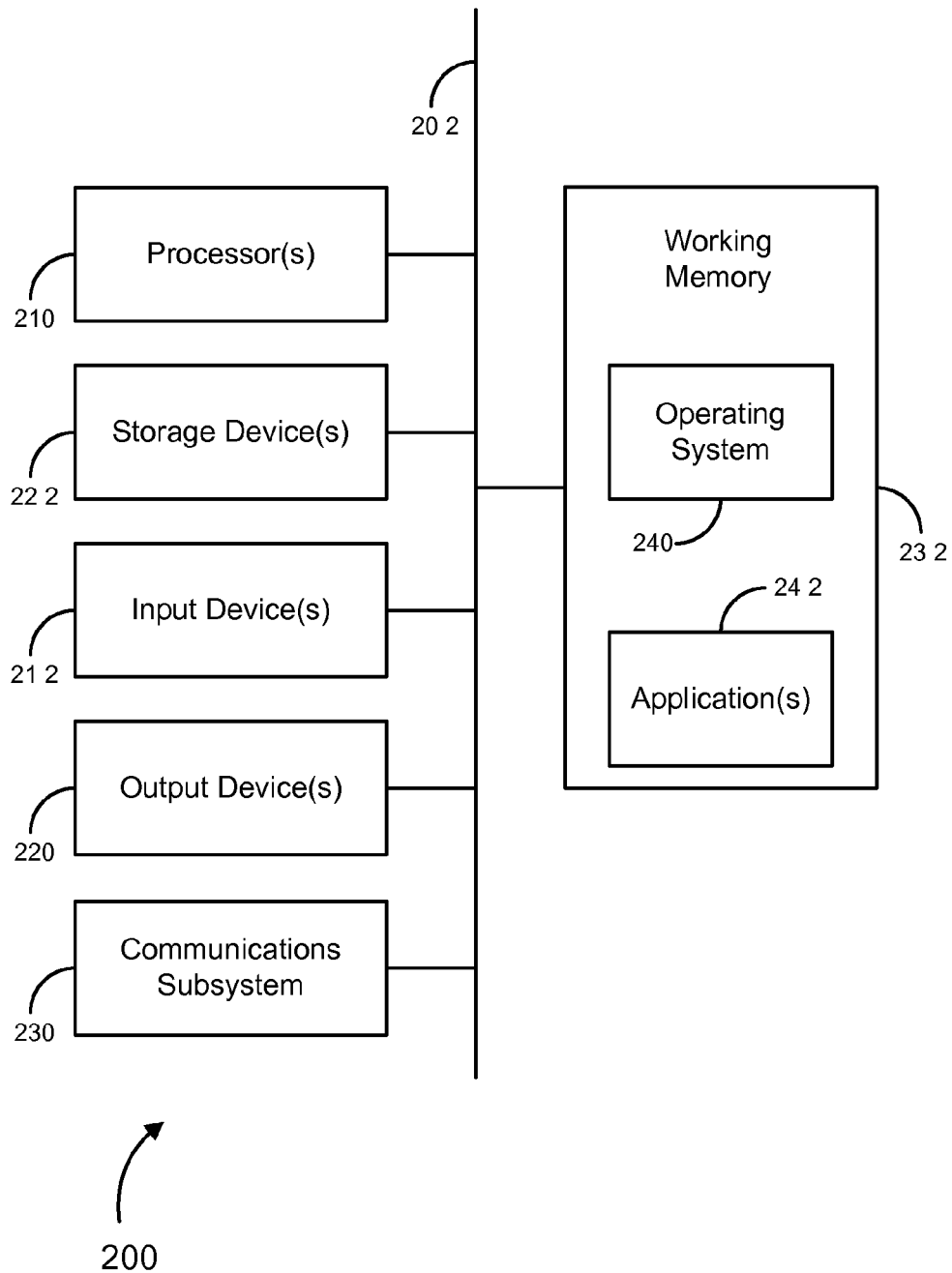
FIG. 2 provides a schematic illustration of a computer system.

FIG. 2 provides a schematic illustration of one embodiment of a computer system 200 that perform the methods provided by various other embodiments, as described herein, and/or can function as the computer systems for the financial institution, merchant, and/or coupon aggregator as described in association with FIG. 1 It should be noted that FIG. 2 is meant only to provide a generalized illustration of various components, any or all of which may be utilized as appropriate. FIG. 2, therefore, broadly illustrates how individual system elements may be implemented in a relatively separated or relatively more integrated manner.

The computer system 200 is shown comprising hardware elements that can be electrically coupled via a bus 202 (or may otherwise be in communication, as appropriate). The hardware elements may include one or more processors 210, including without limitation one or more general-purpose processors and/or one or more special-purpose processors (such as digital signal processing chips, graphics acceleration processors, and/or the like); one or more input devices 212, which can include without limitation a mouse, a keyboard and/or the like; and one or more output devices 220, which can include without limitation a display device, a printer and/or the like.

The computer system 200 may further include (and/or be in communication with) one or more storage devices 222, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 200 might also include a communications subsystem 230, which can include without limitation a modem, a network card (wireless or wired), an infra-red communication device, a wireless communication device and/or chipset (such as a 802.11 device, a WiFi device, a WiMax device, cellular communication facilities, etc.), and/or the like. The communications subsystem 230 may permit data to be exchanged with a network (such as the network described below, to name one example), other computer systems, and/or any other devices described herein. In many embodiments, the computer system 200 will further comprise a working memory 232, which can include a RAM or ROM device, as described above.

The computer system 200 also can comprise software elements, shown as being currently located within the working memory 232, including an operating system 240, device drivers, executable libraries, and/or other code, such as one or more application programs 242, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 222 described above. In some cases, the storage medium might be incorporated within a computer system, such as the system 200. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 200 and/or might take the form of source and/or installable code, which, upon compilation and/or installation on the computer system 200 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 200) to perform methods in accordance with various embodiments of the invention. According to a set of embodiments, some or all of the procedures of such methods are performed by the computer system 200 in response to processor 210 executing one or more sequences of one or more instructions (which might be incorporated into the operating system 240 and/or other code, such as an application program 242) contained in the working memory 232. Such instructions may be read into the working memory 232 from another computer readable medium, such as one or more of the storage device(s) 222. Merely by way of example, execution of the sequences of instructions contained in the working memory 235 might cause the processor(s) 210 to perform one or more procedures of the methods described herein.

The terms "machine-readable storage medium," "machine-readable medium," and "computer readable medium," as used herein, refer to any medium that participates in providing data that causes a machine to operate in a specific fashion. In an embodiment implemented using the computer system 200, various computer readable media might be involved in providing instructions/code to processor(s) 210 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical and/or magnetic disks, such as the storage device(s) 225. Volatile media includes, without limitation, dynamic memory, such as the working memory 235. Transmission media includes, without limitation, coaxial cables, copper wire and fiber optics, including the wires that comprise the bus 202, as well as the various components of the communications subsystem 230 (and/or the media by which the communications subsystem 230 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 200. These signals, which might be in the form of electromagnetic signals, acoustic signals, optical signals and/or the like, are all examples of carrier waves on which instructions can be encoded, in accordance with various embodiments of the invention.

The communications subsystem 230 (and/or components thereof) generally will receive the signals, and the bus 202 then might carry the signals (and/or the data, instructions, etc. carried by the signals) to the working memory 232, from which the processor(s) 210 retrieves and executes the instructions. The instructions received by the working memory 232 may optionally be stored on a storage device 222 either before or after execution by the processor(s) 210.

Figure 3:
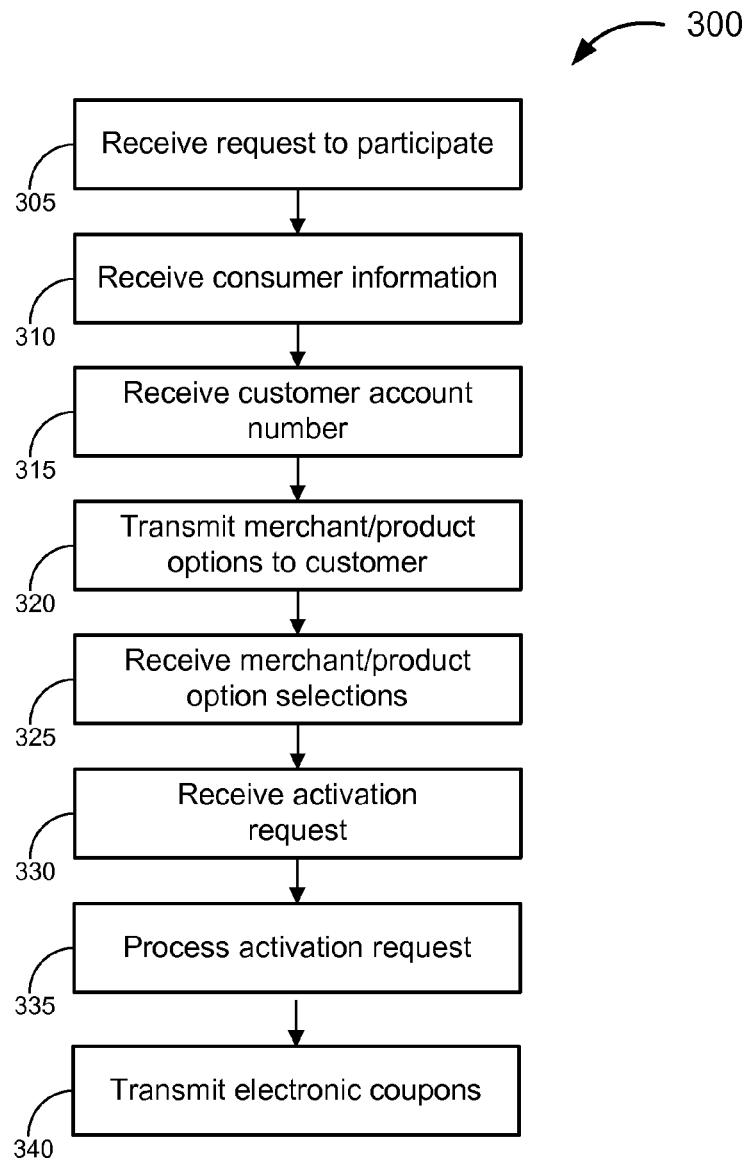
FIG. 3 illustrates a simplified embodiment of a method for enrolling a consumer in an electronic coupon program.

In order for a consumer to participate in an electronic coupon program, in may be necessary for her to enroll. FIG. 3 illustrates a simplified embodiment of a method 300 for enrolling a consumer in an electronic coupon program. At block 305, a request to participate in an electronic coupon program may be received. Such a request may be in the form of a consumer responding to an invite provided by the coupon aggregator. Such an invite may be provided via email, electronic or printed advertisement, direct mailing, and/or a website, to name only a few examples. The consumer may have the opportunity to request participation through several methods. For example, the consumer may be able to call a phone number to request enrollment, enroll through a website, enroll via SMS text message from a mobile device, and/or mail a form to the coupon aggregator. In some embodiments, merchants participating in the electronic coupon program may have the ability to enroll consumers.

At block 310, the coupon aggregator may receive the consumer's information. This may include biographical information about the consumer, including contact information, address information, age, sex, income level, job, hobbies, interests and/or any other information that may allow the coupon aggregator to effectively identify the consumer's buying habits.

At block 315, the coupon aggregator may receive from the consumer an account number to enroll in the electronic coupon program. In some embodiments, as opposed to receiving an account number from the consumer, the coupon aggregator will assign an account number to the consumer, possibly linked to a new credit, debit, or stored value account. In some embodiments, the account is assigned by the financial institution.

At block 320, the coupon aggregator may present the consumer with various options of categories or types of electronic coupons to receive. These options may be standard for all consumers, may be based upon the region the consumer lives in, and/or may be based upon the biographical information provided at block 310. The consumer may have the option to select particular merchants or groups of merchants he wishes to receive coupons from. The consumer may also have the ability to select various genres of merchants, manufacturers, and/or service providers to receive coupons from. For example, a consumer may have the ability to select "BigStore" as a particular merchant to receive electronic coupons from, and/or he might have the option to select "camping outfitters" as a genre of merchants to receive electronic coupons from. The consumer may also be able to specify a maximum number of electronic coupons to receive in a given time period. For example, the consumer may be able to specify that he does not wish to receive more than two coupons per day. The consumer may also have the ability to specify alternative methods of electronic coupon delivery, such as email or direct mailing, as opposed to being sent to a mobile device.

The consumer may also have the ability to select whether the electronic coupons distributed to him will be location specific. Allowing location-specific electronic coupons may involve the coupon aggregator being allowed to access global navigation (such as global positioning satellite) information from the consumer's mobile device. Location-specific coupons may allow the consumer to be presented with coupons based on their location. For example, if a consumer passes within a certain distance of "Joe's Bakery," the consumer may be sent an electronic coupon containing a discount for a purchase at Joe's Bakery. At block 325, the coupon aggregator may receive the consumer's selection of such options. The consumer may also have access to website, interactive voice response system, to update her selections at a later point.

The consumer may then be required to request and confirm activation in the electronic coupon program at block 330. This may include the consumer agreeing to various terms and conditions of the electronic coupon program. For example, this may involve the consumer being responsible for any fees imposed by wireless carriers for delivering the electronic coupons to the consumer's mobile device, whether delivery is via SMS text message or some other method.

At block 335, the activation request may be processed. This may involve forwarding account information to a financial institution, such as the consumer's account number and/or determining which electronic coupons to initially offer to the consumer. In some embodiments, the activation may not be complete until either coupon aggregator or financial institution distributes a transaction device, such as a transaction card or RFID tag to the consumer that is linked to the consumer's account enrolled in the electronic coupon program. Upon receipt, the consumer may be required to activate the transaction device.

Following enrollment, at block 340, electronic coupons may be sent to the consumer's mobile device. The electronic coupons may be sent via several methods. An electronic coupon may be sent to the consumer as an SMS text message. The SMS text message may contain a hyperlink the consumer must follow to view the coupon. In some embodiments, the consumer may receive an email at an email address accessible through his mobile device. In some embodiments, a specialized application may be loaded onto the consumer's mobile device (for example, an application on an smart-phone, such as an APPLE IPHONE or a RIM BLACKBERRY). Such an application may be able to receive coupons and/or check for new coupons, then alert the consumer of the availability of the new coupons. It is important to note, electronic coupons may be sent to a consumer via methods other than a mobile device. For example, the consumer may receive coupons via email or direct mailing. To redeem such coupons, the consumer may still only need to make a purchase from the merchant, service provider, or manufacturer using the account associated with the mobile coupon program.

Also, upon receipt of a coupon, the consumer may be required to respond if he wants to accept the discount associated with the coupon. For example, the coupon may state: "Do you want to receive 52 off your next purchase at Big-Store?" The consumer may have to reply to the offer by sending an SMS text message or selecting an option on the mobile device, such as "Yes! I accept" or, if he is not interested, he may select and option such as "No thanks."

Figure 4:
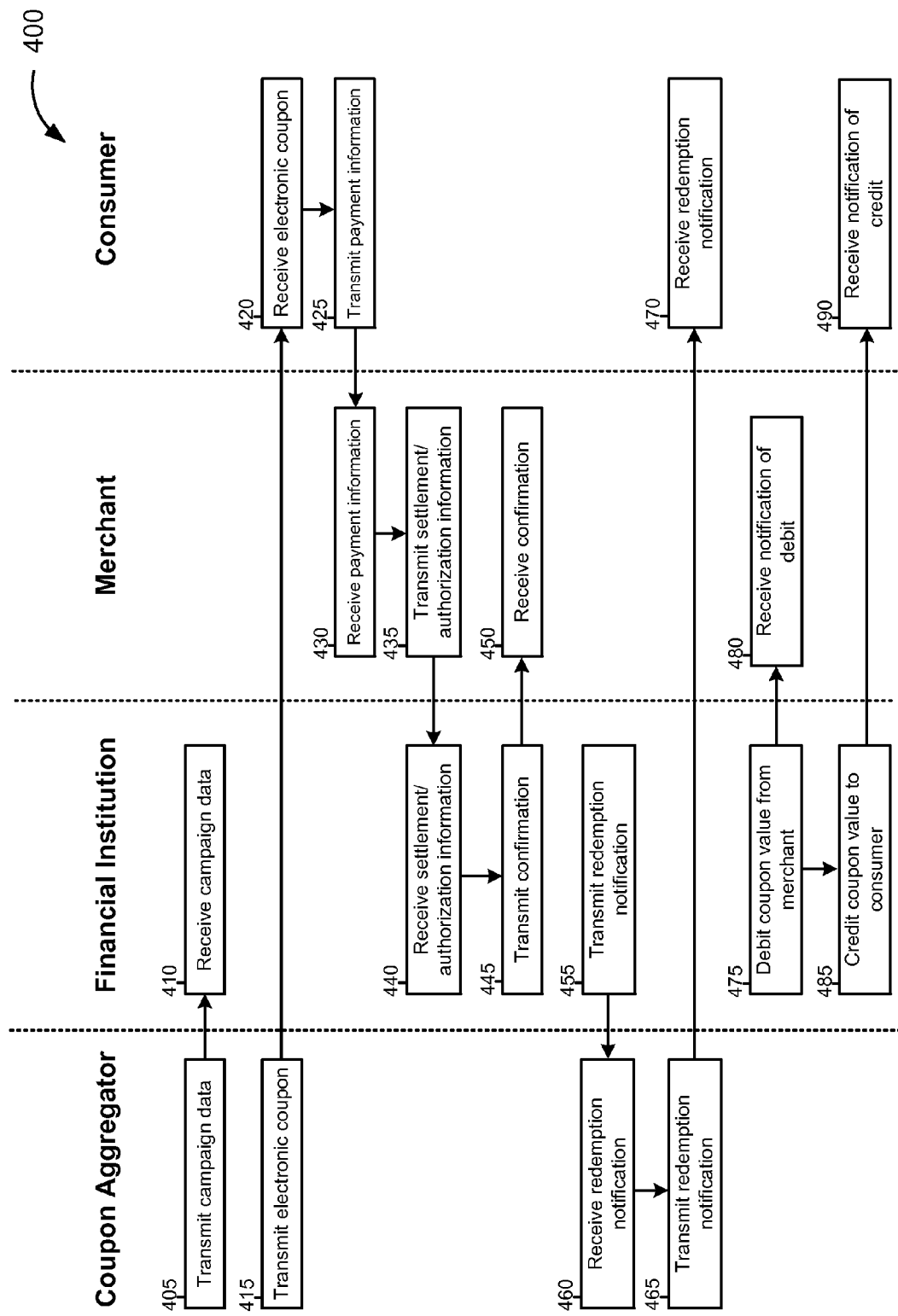
FIG. 4 illustrates a simplified swim diagram showing a method of a coupon aggregator distributing an electronic coupon to a consumer and the consumer subsequently redeeming that electronic coupon.

Once a consumer has received coupons, whether by email, direct mailing, or on his mobile device, the consumer may be able to redeem those coupons by making purchases from the merchant, manufacturer, or service provider associated with the coupon. FIG. 4 illustrates a simplified swim diagram showing the method 400 of a coupon aggregator distributing an electronic coupon to a consumer, and the consumer subsequently redeeming that electronic coupon.

At block 405, a coupon aggregator may transmit coupon campaign data to a financial institution. This coupon campaign data may contain information on the specifics of a particular coupon offer a merchant wishes to make. For example, the campaign data may contain information on: the amount and/or percent of the discount, the name of the merchant offering the discount, the date range the discount is valid for, the locations of the merchant the discount is valid for, a minimum and/or maximum purchase amount the discount is valid for, and any other information pertinent to the electronic coupon. In some embodiments, the coupon aggregator may not transmit such coupon data to the financial institution, and may instead perform various steps on behalf of the financial institution. Also, in some embodiments, the financial institution may only confirm that the account is enrolled, with the coupon aggregator performing further steps. At block 410, the campaign data may be received by the financial institution. This may involve the financial institution storing the campaign data in a database for later comparison to the settlement/authorization data received from merchants.

The coupon aggregator may be the same entity as the financial institution. In such an embodiment, the financial institution may perform all of the functions of both entities. Steps performed between the coupon aggregator and the financial institution may be performed internal to the financial institution or may be eliminated. As illustrated, the invention may function with separate entities for the coupon aggregator and the financial institution. Such embodiments may allow various third party aggregators to compete for coupons from various merchants with the financial institution interacting with several different coupon aggregators.

At block 415, an electronic coupon may be transmitted by the coupon aggregator to a consumer. Information regarding this electronic coupon may have already been received by the financial institution at block 410. The consumer may receive the electronic coupon at block 420. The transmission between the coupon aggregator and the consumer may be in the form of an SMS text message. In such a transmission, the electronic coupon may only be text. As previously described, electronic coupons may also be sent in the form of an e-mail, or may be received and viewed by the consumer using a specialized application or program on the consumer's mobile device. In some embodiments, the consumer may view the electronic coupons using a computer or other electronic device.

The transmission of the electronic coupon at block 415 may have been triggered by the consumer entering a certain geographical area. For example, the consumer's mobile device may be configured to periodically transmit location information, such as in the form of global positioning system coordinates, to the coupon aggregator. Based upon receiving GPS coordinates indicating that the consumer is in a certain location, or is located within a particular geographical region, the coupon aggregator may been triggered to transmit one or more electronic coupons associated with that geographic area to the consumer.

After the consumer has received the electronic coupon at block 420, the consumer may choose never to redeem the electronic coupon. This may mean the consumer never makes a purchase, or a qualifying purchase from the merchant, product manufacturer, or service provider associated with the electronic coupon. In some embodiments, for a coupon to be active, a consumer must positively accept the coupon. This may involve the consumer responding to the electronic coupon with an express acknowledgement. For example, upon receipt of an electronic coupon, the consumer may respond "I accept" via SMS text message or some other form of communication. Also, a significant amount of time may elapse between the reception of electronic coupon at block 420 and when the consumer decides to redeem it. After the consumer has decided to make a purchase that qualifies for the discount associated with the electronic coupon, the consumer may transmit payment information to a merchant at block 425. This payment information may be transmitted wirelessly from an RFID tag. Alternatively, the payment information may be provided using a magnetic stripe, a bar code, and account number, or any other identifier appropriate to identify an account of the consumer. The payment information may contain an account number previously linked by the consumer, the coupon aggregator, and/or the financial institution to the electronic coupon program. This may have occurred during an enrollment process, such as the enrollment process described in relation to FIG. 3 or may have occurred during some other enrollment process.

When the consumer transmits the payment information to the merchant at block 425, the consumer may have been alerted by the merchant the total price for the consumer's purchase. This purchase price may not reflect the discount associated with the electronic coupon. The consumer may be required to pay a greater price (such as full price) for her purchase. Under conditions of enrollment in the electronic coupon program, the consumer may be aware that any discount associated with the electronic coupon issued as part of the electronic coupon program may not be received by the consumer until sometime after the payment transaction with the merchant has been completed.

At block 430, the merchant may receive payment information. The payment information received by the merchant may be identical to or similar to payment information received from a consumer not participating in an electronic coupon program. Therefore, it may be possible that a merchant does not need to update any hardware or software associated with its point-of-sale devices or other payment computer systems in order to participate in an electronic coupon program. Rather, the payment information received by the merchant may include standard credit card, debit card, and/or stored value card account information. This payment information may be received at a point-of-sale device of the merchant. For example, this point-of-sale device may be capable of receiving information stored on an RFID tag and/or may be able to read magnetic stripes, barcodes, or any other machine-readable storage medium. Alternatively, the consumer may be required to enter an account identifier using a keypad at the merchant's point-of-sale device.

Upon receiving the payment information at block 430, the merchant may transmit settlement/authorization information to the financial institution at block 435. The transmission of the settlement/authorization information may appear similar to settlement/authorization information from consumers not participating in electronic coupon program. Again, it may be possible that the merchant does not have to upgrade and/or change any of the hardware and/or software used in the merchant's payment systems to participate in the electronic coupon program. In some embodiments, a flag may be present in the settlement/authorization information to identify the consumer as participating in an electronic coupon program. By way of example, a particular bit in the settlement/authorization information may be set to alert the financial institution that the consumer participates in the electronic coupon program. This bit, or some other flag, may have been part of the payment information transmitted by the consumer at block 425. In some embodiments, it may be part of the consumer's account number. Alternatively, the bit or other flag identifying the consumer participates in the electronic coupon program may be added to the settlement/authorization information by the merchant. For example, the consumer may be required on the merchant's point-of-sale device to identify whether or not he participates in the electronic coupon program. In some embodiments, no bit, flag, or other identifier is used to identify that the consumer participates in the electronic coupon program.

At block 440, the settlement/authorization information may be received by the financial institution. This financial institution may process all settlement/authorization transactions for the merchant. Therefore, whenever a consumer makes a purchase from the merchant using either a credit card, debit card, stored value card, and/or a gift card, the settlement/authorization information for the transaction may be transmitted to the financial institution. Following reception of the settlement/authorization information, the financial institution may confirm that sufficient funds or sufficient credit line is present to fund the transaction.

If there are sufficient funds or sufficient credit line to fund the transaction, at block 445 a confirmation confirming as such may be transmitted to the merchant. If sufficient funds or a sufficient credit line is not present, or if some other problem occurs, such as the account the settlement/authorization information is associated with is suspended or the account has been reported stolen, a failure message may be transmitted in place of the confirmation. At block 445 the financial institution may credit an account associated with the merchant for some or all of the amount paid by the consumer. Assuming that sufficient funds or a sufficient credit line was present and a confirmation acknowledging a successful transaction was transmitted by the financial institution at block 445, the merchant may receive a confirmation at block 450.

At some point after receiving the settlement/authorization information from the merchant at block 440, the financial institution may evaluate the settlement/authorization information to determine if the consumer is entitled to a discount associated with an electronic coupon applied to the transaction. This may involve the financial institution examining the settlement/authorization information for a particular bit, flag, or other identifier that identifies the consumer's account is associated with the electronic coupon program. Alternatively, the financial institution may perform a search through a database to determine if the account identifier received as part of the settlement/authorization information is participating in the electronic coupon program.

After it has been determined by the financial institution that the account received in the settlement/authorization information participates in an electronic coupon program, and that the transaction is eligible for a discount associated with an electronic coupon, the financial institution may transmit a redemption notification to the coupon aggregator at block 455. This redemption notification may identify the coupon that the consumer has redeemed and provide other information to the coupon aggregator regarding the transaction. For example, the redemption notification may include information on how much the consumer spent at the merchant, what time the transaction occurred, the location of the transaction, the amount of time between when the consumer received the coupon and when the consumer made the qualifying purchase, and/or any other information that may be useful in determining consumer behavior and purchasing patterns. The transmission of the redemption notification from the financial institution to the coupon aggregator may be in real-time or near real-time. This may mean that the coupon aggregator receives the redemption notification at block 460 within minutes or seconds (or less than a second) of when the financial institution received the settlement/authorization information at block 440.

At block 460, the coupon aggregator may receive the redemption notification. Once the redemption notification has been received, the coupon aggregator may store the data associated with the redemption notification, such as the metrics for determining consumer behavior purchase patterns described above. The coupon aggregator may also notify the merchant that the consumer has redeemed the electronic coupon.

At block 465, the coupon aggregator may transmit redemption notification to the consumer. This redemption notification may be transmitted using the same method as was used to transmit the electronic coupon to the consumer at block 415. At block 470, the consumer may receive the redemption notification. Again, for example, the transmission may be via an SMS text message, e-mail, or may be received by the consumer using a specialized application on the consumer's mobile device. This redemption notification may be received by the consumer in real-time or near real-time. Within seconds or minutes after the consumer has transmitted the payment information to the merchant at block 425, the consumer may receive a redemption notification at block 470. The redemption notification received by the consumer at block 470 from the coupon aggregator may indicate to the consumer that the electronic coupon has been successfully redeemed and that the value of the coupon has been or will be credited to the consumer's account. The redemption notification may indicate the monetary value of the discount that has been or will be credited to the consumer. The redemption notification may also include a follow-up offer for a further discount at the merchant. While the redemption notification may be received by the same method that the electronic coupon was initially transmitted to the consumer in, the redemption notification may also be transmitted by some other method. For example while the consumer may receive electronic coupons on his mobile device, the consumer may receive redemption notifications via e-mail. This may be an option that the consumer selected during enrollment.

At block 475, the financial institution may debit the discount associated with the electronic coupon due to the consumer from a financial account associated with the merchant. At this point, the merchant may have received payment from the consumer in an amount that does not take into effect the discount associated with electronic coupon. Therefore, for example, if the electronic coupon specifies that the merchant offered 10% off the consumer's purchases from the merchant and the consumer made purchases totaling $120, at block 475 a total of $12 may be debited from an account associated with the merchant. This financial account of the merchant may be held with the financial institution or a third-party financial institution. At block 480, the merchant may receive notification of this debit. In some embodiments, the merchant receives a periodic statement listing all of the discounts associated with electronic coupons debit from the merchant's account over a period of time.

At block 485, the financial institution may credit the coupon value to an account associated with the consumer. This account may be the account used by the consumer to conduct the purchase with the merchant and may also be the account enrolled in the electronic coupon program. At block 490, the consumer may receive notification of the credit to his account. The consumer may receive a periodic statement listing all of the discounts associated with electronic coupons credited to his account over a period of time.

While the swim chart of FIG. 4 details a discount offered by a merchant, this is meant for example purposes only and is not meant to restrict the invention. For example, a discount may also be offered by a service provider or a product manufacturer. For example, a product manufacturer may offer an electronic coupon through a coupon aggregator for one or more of its products, with the coupon being redeemable at any merchant offering those products. The method of FIG. 4 may be modified to accommodate such changes. For example, at block 435, where the merchant transmits settlement/authorization information to the financial institution, in addition to the standard settlement/authorization information, information regarding what products and/or services were purchased by the consumer may be transmitted to the financial institution. This may include SKU (stock-keeping unit) data. When such data is transmitted, the financial institution may be able to determine specific products and/or services the consumer has purchased. This may involve upgrading software and/or hardware at the merchant to allow for such information to be transmitted to the financial institution. The financial institution, after receiving settlement/authorization information including product information (such as SKU data), may determine whether an electronic coupon applies to the consumer's purchase of those products. If an electronic coupon applies, the method may continue at block 455. An additional difference may be present at block 475: as opposed to debiting the coupon value from an account associated with the merchant, the coupon value may be debited from an account associated with the manufacturer of the product.

Figure 5:
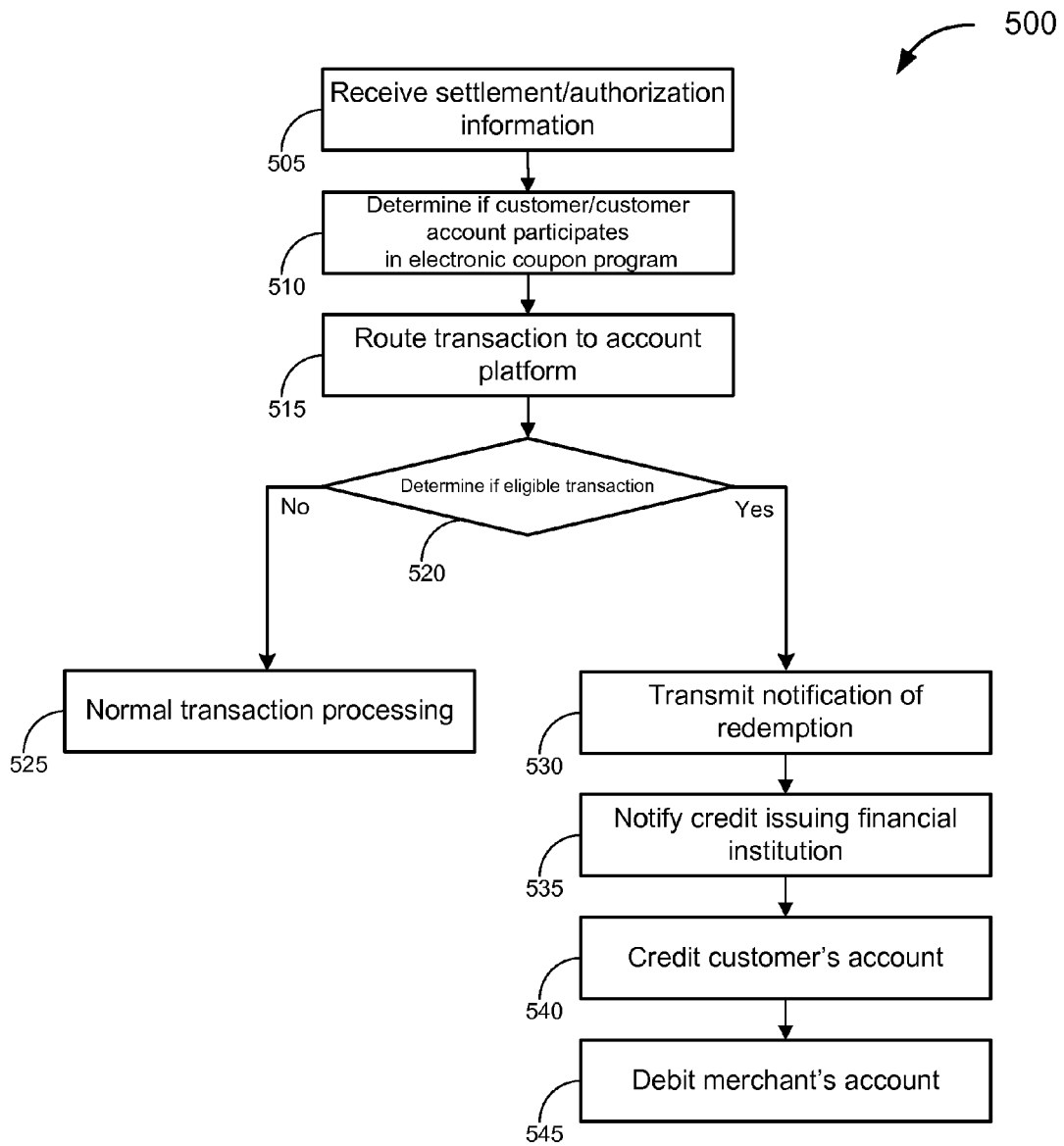
FIG. 5 illustrates a flow diagram of an embodiment of a method a financial institution may follow to process electronic coupons.

The financial institution of FIG. 4 may contain additional internal processes to authorize and settle transaction involving electronic coupons. FIG. 5 illustrates a flow diagram of a simplified method 500 the financial institution of FIG. 4 may follow to process electronic coupons. The flow diagram of FIG. 5 may also illustrate a process of a financial institution other than the financial institution illustrated in FIG. 4 may follow to process electronic coupons.

At block 505, the financial institution may receive settlement/authorization information. This information may be received from a merchant or other party initiating a financial transaction. The settlement/authorization information may be received at the financial institution from the merchant through a public network, such as the Internet, or a private network, possibly maintained by the financial institution.

At block 510, the financial institution may make a determination of whether the account (and/or the consumer associated with the account) contained in the settlement/authorization information participates in an electronic coupon program. This may involve searching a database to determine if the account identified in the settlement/authorization information is associated with an electronic coupon program. In some embodiments, the settlement/authorization information may contain a flag (possibly one bit) indicating that the transaction involves an electronic coupon or that the account is associated with an electronic coupon program. In some embodiments, the settlement/authorization information may be routed based on the type of account identified in the settlement/authorization information. In some embodiments, the settlement/authorization information is initially routed based on the account type, and then may be routed again based on participation in an electronic coupon program.

If it is determined that the transaction involves an electronic coupon or it is determined that the account contained in the settlement/authorization information participates in an electronic coupon program, the settlement/authorization information may be routed to a particular account platform, within the financial institution for further processing at block 515. For example, if an account participates in an electronic coupon program, the settlement/authorization information may be routed to a particular financial platform the financial institution's stored value account platform. In some embodiments, it may not matter whether the account participating in the electronic coupon program is a credit, debit, or stored value account. The financial institution may use one account platform to manage all of the accounts associated with the electronic coupon program.

At block 520, the financial institution may determine whether the transaction detailed in the settlement/authorization information is eligible for a discount. This may involve determining whether the transaction meets all of the requirements of an electronic coupon. These requirements may include ensuring the transaction was with the correct merchant, at the correct merchant location, during the correct time period, for at least a minimum purchase amount, the consumer properly accepted the coupon, etc. If the requirements of the electronic coupon are not met, the transaction may be processed normally at block 525.

If the requirements for the electronic coupon are met, a notification of redemption may be transmitted from the financial institution to the consumer and/or the coupon aggregator at block 530. This notification may occur via such methods as a text message, email, or any other acceptable format. The notification may state: "Coupon at BigStore successfully redeemed!" In some embodiments, the notification may note the consumer's new account balance and/or state the amount of money the electronic coupon was redeemed for.

At block 535, a notification may be sent to credit the consumer's account for some or all of the value of the coupon. This notification may involve the financial institution notifying a bank that maintains the consumer's account to apply a credit to the account. If the account is held directly with the financial institution, the credit may be applied without the need for such a notification.

At block 540, the consumer's account may be credited with some or all of the value of the discount associated with the redeemed electronic coupon. At block 545, the merchant's account may be debited for some or all of the value of the electronic coupon. An additional amount (above the value of the coupon) may be debited from the merchant's account by the financial institution as a fee for use of the electronic coupon program. In some embodiments, the financial institution keeps a percent or set amount of the value of the electronic coupon debited from the merchant's account. As previously described, product manufacturers and service providers may also participate in such an electronic coupon program in place of a merchant.

Figure 6:
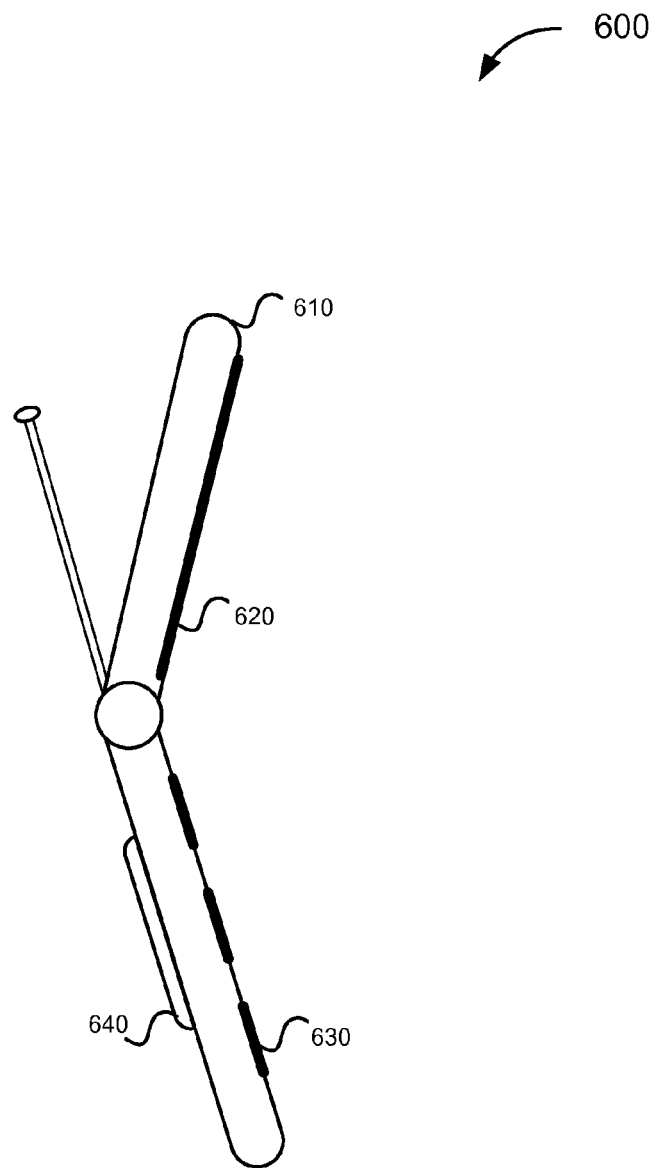
FIG. 6 illustrates a simplified embodiment of a mobile device that allows for wireless electronic coupon and purchase transactions.

If such an electronic coupon program is integrated with a wireless payment scheme, a consumer may be able to receive coupons, accept coupons, pay for products, and redeem coupons all from a mobile device. FIG. 6 illustrates an embodiment of a mobile device 600 that allows such functionality. The cellular phone 610 has a screen 620 and keypad 630. Additionally, an RFID device 640 may be attached to the cellular phone 610. Such an RFID device may allow for wireless transactions with a merchant. The RFID device 640 may be affixed to the cellular phone by a consumer. For example, the consumer may use a product such as FIRST DATA's GO-TAGs as an RFID tag. GO-TAGS are an RFID device 640 containing account information to be affixed to various surfaces. In some embodiments, the RFID device 640 is integrated with the cellular phone 610 by the cellular phone's manufacturer. In such embodiments, the RFID device 640 may be internal to the case of the cellular phone 610.

Alternatively, the RFID device 640 may be maintained separately from the cellular phone 610. For example, the consumer may receive electronic coupons on cellular phone 610, with the coupons displayed on screen 620, but payment may occur with the merchant via an RFID device held by the consumer separately, such as in the form of a key fob or transaction card. Of course, a standard transaction card, using a magnetic stripe, barcode, or any other machine-readable storage medium may also be used in place of an RFID device.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. For example, the methods and processes may be implemented using a system, such as system 100 of FIG. 1. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of issuing and redeeming an electronic coupon, the method comprising:

transmitting, by a financial institution computer system to a mobile device of a consumer, the electronic coupon, wherein the electronic coupon is linked to a discount monetary amount;

receiving, by the financial institution computer system, settlement data from a merchant point-of-sale device, wherein the settlement data is linked to a purchase transaction associated with a financial account of the consumer and includes merchant account information associated with a merchant account and a merchant electronic coupon program and an indicator within a portion of an account number of the financial account of the consumer that indicates the consumer participates in the merchant electronic coupon program;

identifying, by the financial institution computer system, the merchant account information and the indicator within the settlement data;

validating, by the financial institution computer system, the electronic coupon in response to identifying the merchant account information and the indicator;

transmitting, by the financial institution computer system to the mobile device, a notification that the electronic coupon has been successfully redeemed;

debiting, by the financial institution computer system, at least the discount monetary amount from the merchant account associated with the merchant electronic coupon program; and crediting, by the financial institution computer system, at least a portion of the discount monetary amount of the electronic coupon to the financial account of the consumer.

2. The method of claim 1, wherein the settlement data received by the financial institution computer system from the merchant point-of-sale device reflects a monetary amount without subtraction of the discount monetary amount.

3. The method of claim 1, further comprising: receiving, by the financial institution computer system, before transmitting the electronic coupon to the mobile device of the consumer, an enrollment request from the consumer, wherein the enrollment request indicates the consumer wishes to participate in the electronic coupon program and indicates a financial account to enroll in the electronic coupon program.

4. The method of claim 1, wherein the electronic coupon is linked to a merchant or a group of merchants.

5. The method of claim 1, wherein the financial account of the consumer is a stored value account.

6. The method of claim 5, wherein the stored value account of the consumer is held by the financial institution.

7. The method of claim 1, wherein the mobile device is a cellular phone.

8. The method of claim 1, further comprising: receiving, by the financial institution computer system, a response from the consumer indicating that the consumer has accepted the electronic coupon.

9. The method of claim 8, further comprising: storing, by the financial institution computer system, a record indicating that the consumer has accepted the electronic coupon.

10. The method of claim 8, wherein the transmitting the notification that the electronic coupon has been successfully redeemed occurs via a SMS text message.

11. A financial institution computing system, comprising:
one or more processors; and
memory containing instructions that when executed by the one or more processors cause the one or more processors to:
transmit an electronic coupon to a mobile device of a consumer, wherein the electronic coupon is linked to a discount monetary amount;
receive settlement data from a merchant point-of-sale device, wherein the settlement data is linked to a purchase transaction associated with a financial account of the consumer and includes merchant account information associated with a merchant account and a merchant electronic coupon program and an indicator within a portion of an account number of the financial account of the consumer that indicates the consumer participates in the merchant electronic coupon program;
identify the merchant account information and the indicator within the settlement data;
validate the electronic coupon in response to identifying the merchant account information and the indicator;
transmit a notification to the mobile device that the electronic coupon has been successfully redeemed;
debit at least the discount monetary amount from the merchant account associated with the merchant electronic coupon program; and
credit at least a portion of the discount monetary amount of the electronic coupon to the financial account of the consumer.

* * * * *